United States Patent
Churchyard

(10) Patent No.: US 7,039,702 B1
(45) Date of Patent: May 2, 2006

(54) NETWORK ANALYZER ENGINE SYSTEM AND METHOD

(75) Inventor: Peter J Churchyard, Mt Airy, MD (US)

(73) Assignee: McAfee, Inc., Santa Clara, CA (US)

( * ) Notice: Subject to any disclaimer, the term of this patent is extended or adjusted under 35 U.S.C. 154(b) by 828 days.

(21) Appl. No.: 10/133,803

(22) Filed: Apr. 26, 2002

(51) Int. Cl.
G06F 15/173 (2006.01)

(52) U.S. Cl. ............... 709/224; 709/223; 709/225; 709/226; 714/39

(58) Field of Classification Search ........ 709/223–226; 714/39
See application file for complete search history.

(56) References Cited

U.S. PATENT DOCUMENTS

| | | | | |
|---|---|---|---|---|
| 6,044,402 A * | 3/2000 | Jacobson et al. | ........... | 709/225 |
| 6,108,700 A * | 8/2000 | Maccabee et al. | .......... | 709/224 |
| 6,195,352 B1 | 2/2001 | Cushman et al. | ........... | 370/395 |
| 6,347,374 B1 * | 2/2002 | Drake et al. | ................. | 709/224 |
| 6,836,894 B1 * | 12/2004 | Hellerstein et al. | ......... | 719/318 |
| 6,915,456 B1 * | 7/2005 | Banerjee et al. | .............. | 714/39 |
| 2004/0205565 A1 * | 10/2004 | Gupta | ........................ | 714/48 |

* cited by examiner

*Primary Examiner*—David Wiley
*Assistant Examiner*—Phuoc H. Nguyen
(74) *Attorney, Agent, or Firm*—Zilka-Kotab, PC; Christopher J. Hamaty

(57) ABSTRACT

A system, method and computer program product are provided for generating code for analyzing a network. Initially, a plurality of rules is identified defining a manner in which a network is to be analyzed. Next, code is generated based on the rules. Such code is capable of being used by a network analyzer for analyzing a network in accordance with the rules.

17 Claims, 7 Drawing Sheets

NETWORK ANALYZER ENGINE SYSTEM AND METHOD

FIELD OF THE INVENTION

The present invention relates to network analysis, and more particularly to network analyzer engines.

BACKGROUND OF THE INVENTION

Numerous tools have been developed to aid in network management involving capacity planning, fault management, network monitoring, and performance measurement. One example of such tools is the network analyzer.

In general, a "network analyzer" is a program that monitors and analyzes network traffic, detecting bottlenecks and problems. Using this information, a network manager can keep traffic flowing efficiently. A network analyzer may also be used to capture data being transmitted on a network. The term "network analyzer" may further be used to describe a program that analyzes data other than network traffic, or may also be used to classify packets into flows. For example, a database can be analyzed for certain kinds of duplication. One example of a network analyzer is the SNIFFER® device manufactured by NETWORK ASSOCIATES, INC®.

Traditional network analyzers have been functionally limited to assessing a network, rather than security-related functions. Recent network analyzers, however, have been designed to detect security-related aspects of a network (i.e. intrusion detection, etc.). Unfortunately, such security-related aspects require that network monitoring rules be constantly updated to reflect up-to-date intelligence regarding security issues (i.e. a known hacker IP address, virus, etc.).

There is thus a need for allowing a user to efficiently and effectively update a network analyzer.

DISCLOSURE OF THE INVENTION

A system, method and computer program product are provided for generating code for analyzing a network. Initially, a plurality of rules is identified defining a manner in which a network is to be analyzed. Next, code is generated based on the rules. Such code is capable of being used by a network analyzer for analyzing a network in accordance with the rules.

In one embodiment, the rules may be written in extensible markup language (XML). Moreover, the rules may define abnormal network traffic to be detected on the network.

In another embodiment, it may be determined whether the rules have changed. If it is determined that the rules have changed, the code may be re-generated to reflect the modified rules.

In still another embodiment, the code may be generated by parsing the rules. Such rules may be parsed to generate a matrix. This matrix may be generated by building a chain of pointers to values for each rule.

As an option, each value of the matrix may include a pointer to an associated attribute type which, in turn, may include a pointer to a plurality of associated values. Each of such values, in turn, may include a pointer to the associated rule.

In still yet another embodiment, the values that are common may be shared. Moreover, the attribute types may be sorted. In use, the matrix may be converted into a decision tree. Thus, the code may be generated based on the decision tree.

As an option, a cost (resource usage, etc.) is identified prior to or while the code is being generated. Such code may then be generated based on the cost. In particular, the code may be generated to minimize such cost.

DESCRIPTION OF THE PREFERRED EMBODIMENTS

Figure 1:
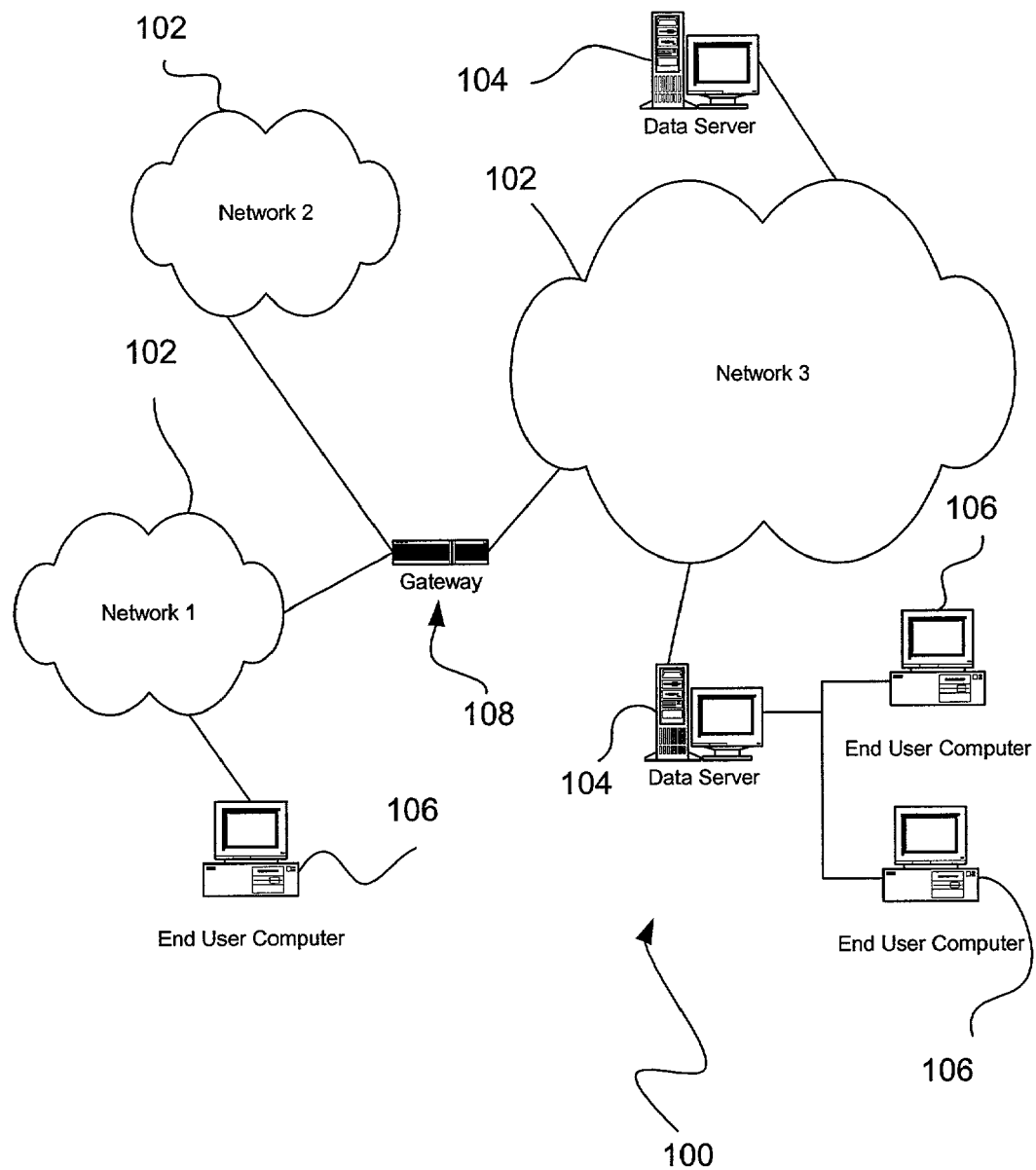
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway 108 is coupled therebetween. It should be noted that each of the foregoing network devices as well as any other unillustrated devices may be interconnected by way of a plurality of network segments.

Coupled to any one of the foregoing components and/or segments may be a network analyzer. One exemplary network analyzer that may be used is the SNIFFER® device manufactured by NETWORK ASSOCIATES, INC®. In use, the network analyzer is adapted for monitoring and analyzing network traffic, detecting bottlenecks, abnormal traffic, problems, etc. Furthermore, the network analyzer may be capable of various security functionality (i.e. intrusion detection, virus scanning, firewalling, etc.).

In use, the network analyzer or a module associated therewith is adapted for generating code for analyzing a network such as that of FIG. 1. Initially, a plurality of rules is identified defining a manner in which a network is to be analyzed. Next, code is generated based on the rules. Such code is capable of being used by the network analyzer for analyzing a network in accordance with the rules. More information regarding one exemplary implementation of such functionality will be set forth hereinafter in greater detail.

Figure 2:
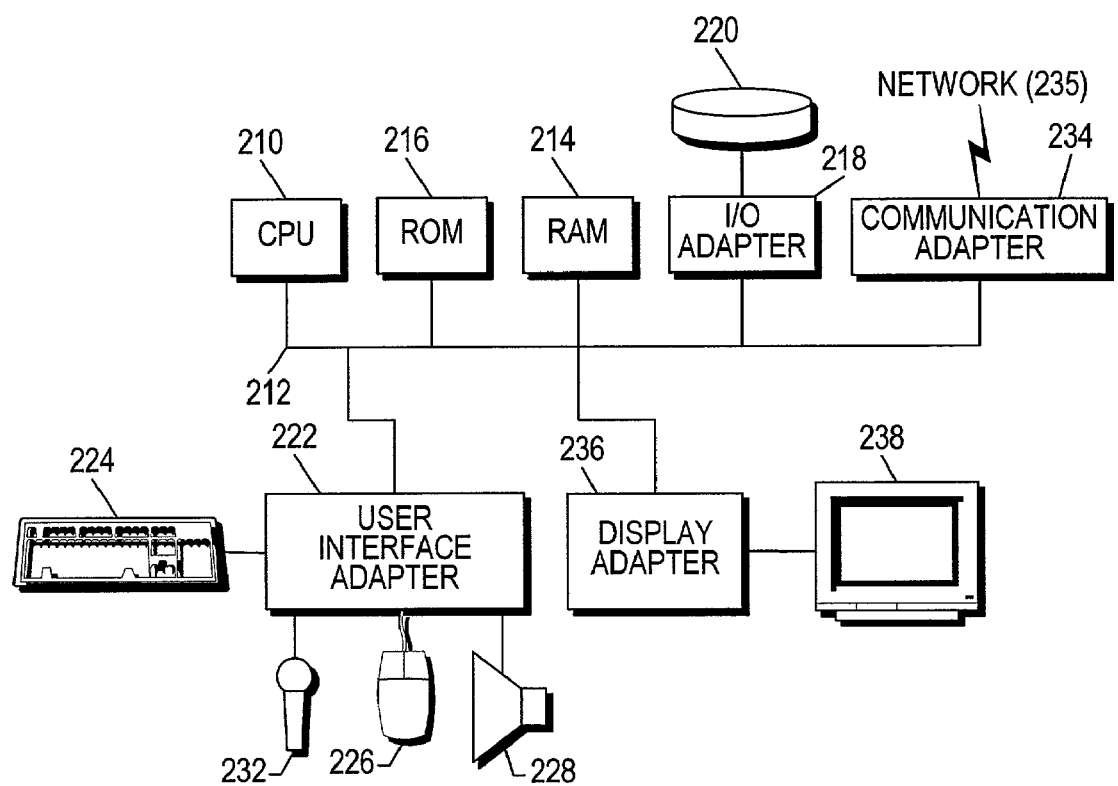
FIG. 2 shows a representative hardware environment that may be associated with the data servers and computers of FIG. 1, in accordance with one embodiment.

FIG. 2 shows a representative hardware environment that may be associated with the data server computers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology.

Figure 3:
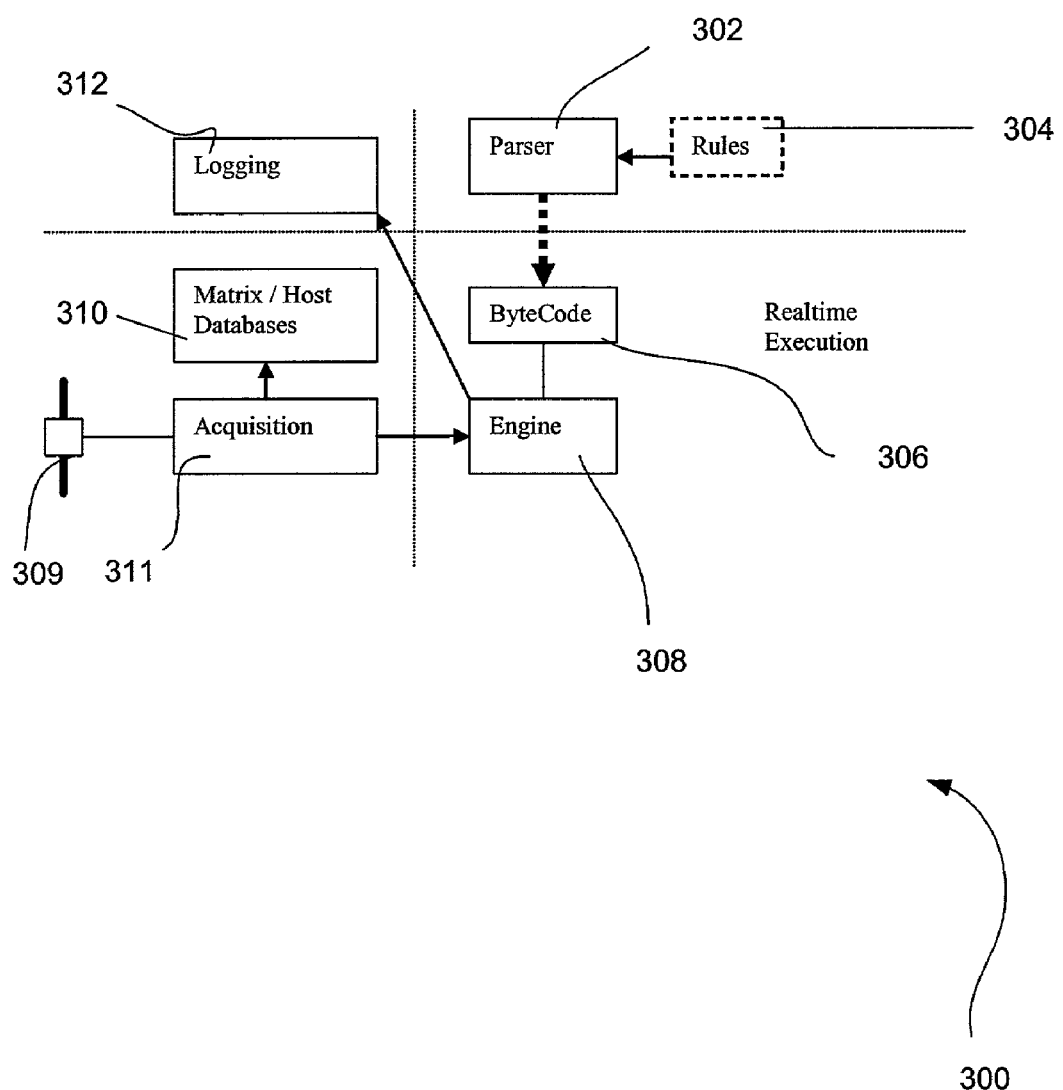
FIG. 3 illustrates an exemplary framework with which one embodiment may be carried out.

FIG. 3 illustrates an exemplary framework 300 with which one embodiment may be carried out. In one embodiment, the framework 300 may be implemented in the context of the aforementioned network analyzer. Of course, the present framework 300 may be implemented in any desired context.

As shown, a parser 302 is provided for receiving a plurality of rules 304 for the purpose of generating code 306. In one embodiment, such code 306 may indicate which types of network communications should be detected during network analysis. This may be accomplished by the rules specifying packet fields and a value or range of values that are permitted or denied. Of course, any rules 304 may be used to generate the code 306. For example, the rules 304 may specify various heuristics or the like. Still yet, the rules 304 may specify actions that need to be performed based on the detected network communications. Typical actions include logging a packet, enabling packet capture, security actions (i.e. firewalling, intrusion detection), etc.

Moreover, the rules may be written in extensible markup language (XML). Table 1 illustrates an exemplary rule syntax.

TABLE 1

| Rule Syntax | |
|---|---|
| START: | IF EXPRESSIONS THEN ACTIONS; |
| ACTIONS: | ACTION \| |
| | ACTIONS ACTION; |
| ACTION: | ALERT MSG \| |
| | LOG LOG_CONDITION \| |
| | TRIGGER TRIGGER_ACTION; |
| EXPRESSIONS: | EXPRESSION \| |
| | EXPRESSIONS AND EXPRESSION; |
| EXPRESSION: | FIELDBASED \| |
| | NONFIELDBASED; |
| FIELDBASED: | FILEDBASEDEXPR == VALUE \| |
| | FILEDBASEDEXPR <> VALUE \| |
| | FILEDBASEDEXPR > VALUE \| |
| | FILEDBASEDEXPR < VALUE \| |
| | FILEDBASEDEXPR BETWEEN VALUE1 AND VALUE2; |
| FIELDBASEDEXPR: | HEADER(INDEX, OFFSET, MASK, SHIFT) \| |
| | FIELDBASEDEXPR + HEADER(INDEX, OFFSET, MASK, SHIFT) \| |
| | FIELDBASEDEXPR − HEADER(INDEX, OFFSET, MASK, SHIFT); |
| NONFIELDBASED: | IPFRAGASSEMBLY \| |
| | PROTOCOLDECODE; |
| PROTOCOLDECODE: | HTTP: HTTPEXPRS \| |
| | FTP: FTPEXPRS \| |
| | TELNET: TELNETEXPRS; |
| HTTPEXPRS: | HTTPEXPR |
| | HTTPEXPRS AND HTTPEXPR; |
| HTTPEXPR: | METHOD == METHOD_TYPE \| |
| | CONTENT == STRING; |
| METHOD TYPE: | GET \| |
| | POST; |

As an option, the parser 302 may be run only when the rules 304 are changed. Moreover, parser modules can be defined in a secure configuration file. Table 2 illustrates the manner in which the parser 302 may thereby be extensible.

Table 2

| A module definition rule has the following syntax: | | | |
|---|---|---|---|
| MODULE | name | parsedll | [enginedll] |
| name | A name for this module, used in the modfunc rules to specify which module the functions are in. | | |
| parsedll | The path of the parser dll that will generate the byte codes for the modfunc options. | | |
| Enginedll | Optional path of the dll that the engine will load at runtime. | | |

| The functions in the module are specified using the following syntax: | | | |
|---|---|---|---|
| MODFUNC | name | func[:ordinal] @sortorder | func2[:ordinal] @sortorder |
| Name | A name of a module | | |
| Func | The name of a function | | |

Table 2-continued

| :ordinal | Optional ordinal of function in the dll. |
|---|---|
| Sortorder | Used to determine the place the code for this option in the decision tree. |

Once the rules 304 are parsed, the code 306 may, in turn, be used by a network analyzer engine 308 to analyze a network. The analyzer engine 308 works in conjunction with an acquisition module 311 for acquiring network communication data from a network 309. Such acquisition module 311 may simply include an agent of any sort. Also included is a database 310 for storing the data. Still yet, a logging module 312 may be provided for logging the collection of network communication data and the monitoring thereof.

In one embodiment, the code 306 is loaded by the engine 308 when it is started or instructed to re-load them. The engine 308 may be called in real-time on a packet-by-packet basis. The acquisition module 311 may do some buffering, but the packets are presented to the engine 308 with minimal delay. The engine 308 may process each packet completely or may suspend processing of a packet when the next packet arrives.

In use, the engine 308 analyzes the packets and generates responses such as alerts and log messages based on the code 306. One part of the engine 308 deals with checking fields within the packet to see if they have various values. The fields may be 1, 2, 4 or more bytes long and may be in big endian or little endian order.

The engine 308 is thus driven through the code 306 generated by the parser 302. The engine 308 may take the form of a fetch execute loop, in accordance with one exemplary embodiment. Thus, the engine 308 may have a pointer to the next code 306. During each iteration, the engine 308 may fetch the current code 306, increment the pointer and decode the code 306. As well as an instruction pointer, the engine 308 may use a data stack pointer and a return address stack pointer. The data stack may be used to hold values that are being processed. As an example, an add instruction may replace the top two elements of the data stack with their sum. Table 3 illustrates various exemplary engine instructions.

TABLE 3

| Code | Attributes | Description |
|---|---|---|
| 0x00 | | No Op |
| 0x01 | | Exit |
| 0x02 | Pointer index, 0 = MAC, 1 = IP | Get Pointer (to packet contents) |
| 0x03 | | 8 bit signed literal |
| 0x04 | | 16 bit big endian literal |
| 0x05 | | 32 bit big endian literal |
| 0x06 | | 8 bit signed fetch |
| 0x07 | | 16 bit big endian fetch |
| 0x08 | | 32 bit big endian fetch |
| 0x09 | | Drop, drop top of stack. |
| 0x0a | | Pointer store |
| 0x0b | | Add |
| 0x0c | | Subtract |
| 0x0d | | And |
| 0x0e | | Or |
| 0x0f | | Xor |
| 0x10 | | DUP |
| 0x11 | | Switch |
| 0x12 | | Jump |
| 0x13 | | Skip |
| 0x14 | | If |
| 0x15 | | Mask and Compare |

TABLE 3-continued

| Code | Attributes | Description |
|---|---|---|
| 0x16 | | Not |
| 0x17 | | Table entry fetch |
| 0x18 | | Var fetch |
| 0x19 | | Var store |
| 0x20 | | Call Module Function |
| 0x21 | | Malloc |
| 0x22 | | Free |
| 0x30 | | Sni_Read |
| 0x31 | | Sni_Write |
| 0x32 | | Sni_Open |
| 0x33 | | Sni_Close |
| 0x7f | | MessageBox |

Figure 4:
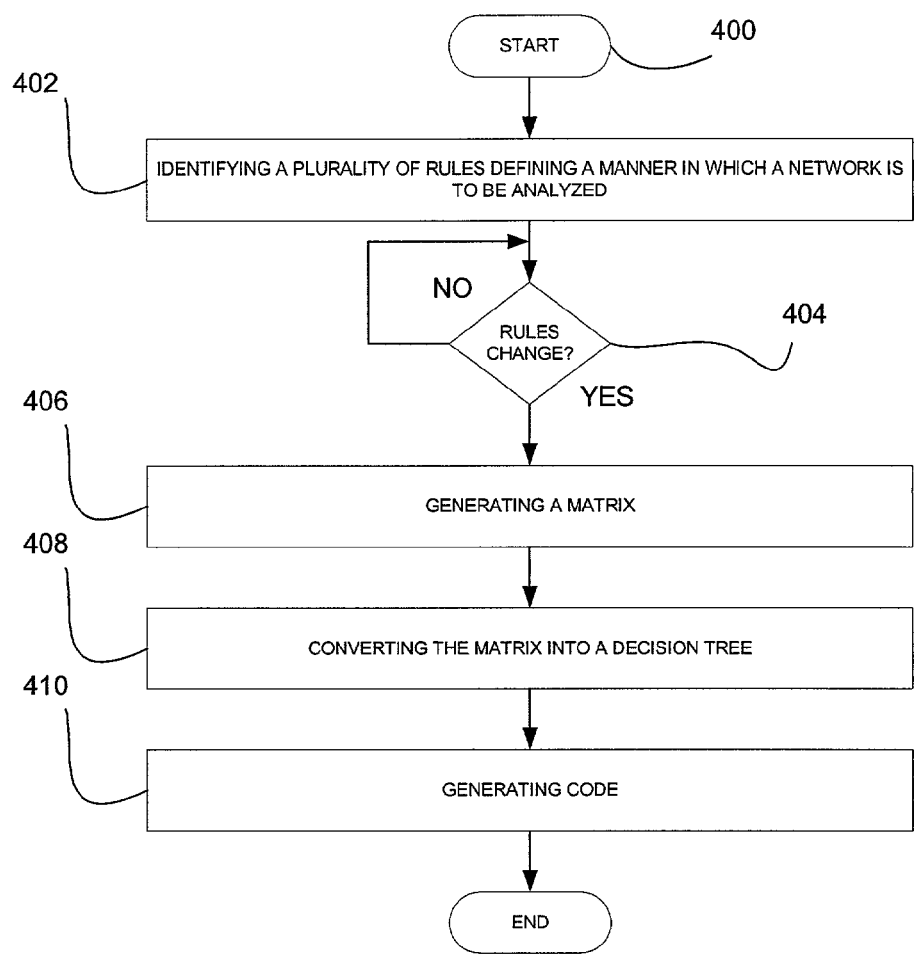
FIG. 4 illustrates a method for generating code for analyzing a network, in accordance with one exemplary embodiment.

FIG. 4 illustrates a method 400 for generating code for analyzing a network, in accordance with one exemplary embodiment. It should be noted that the present method 400 may implemented in the context of the aforementioned framework 300 of FIG. 3. Of course, the present method 400 may be carried out in any desired context.

Initially, a plurality of rules defining a manner in which a network is to be analyzed is identified. Note operation 402. Again, in one embodiment, such rules may be written in extensible markup language (XML) and define abnormal network traffic to be detected on the network. Of course, the rules may be written in any language and define any manner in which the network is to be analyzed.

It is then determined whether the rules have changed or have been updated in decision 404. If it is determined that the rules have changed, the rules are parsed to define a matrix. See operation 406. With the matrix generated, it is subsequently converted into a decision tree from which code is generated. Note operations 408–410. More information regarding such process of building a matrix and subsequent operations will be set forth in greater detail during reference to FIG. 5.

Figure 5:
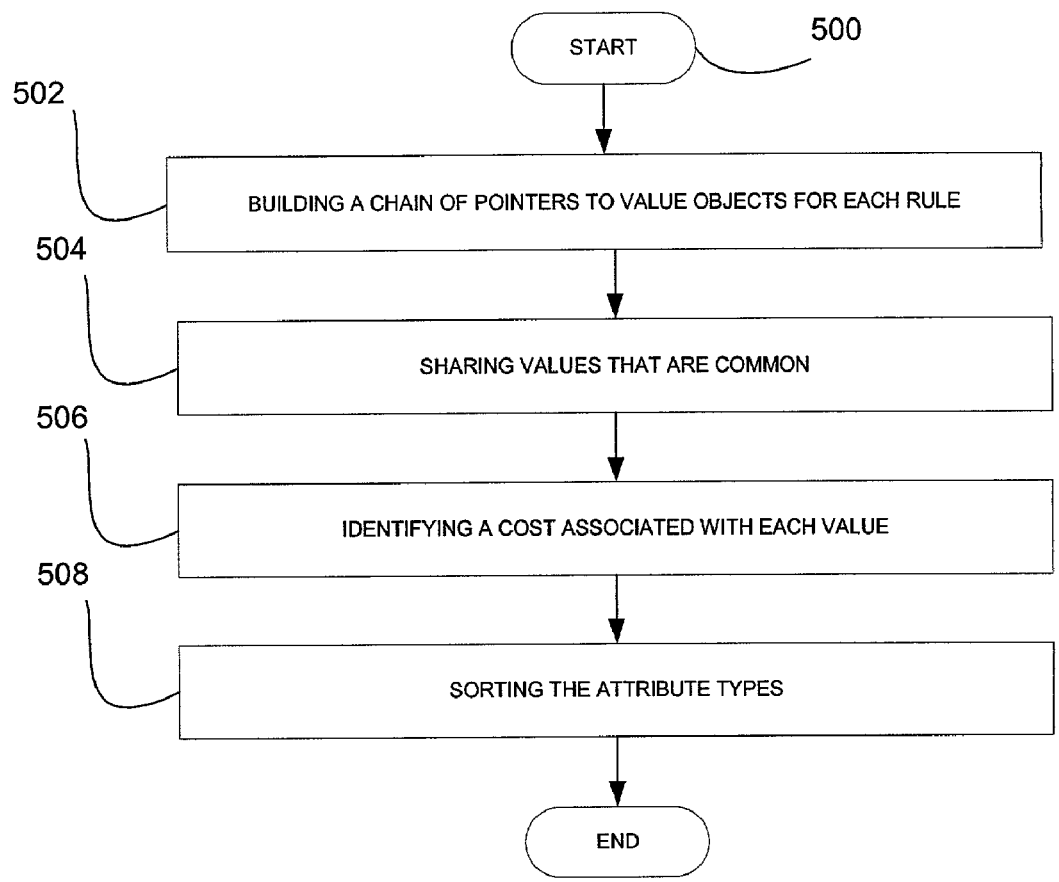
FIG. 5 illustrates an exemplary method for building a matrix, in accordance with operation 406 of FIG. 4.

FIG. 5 illustrates an exemplary method 500 for building a matrix, in accordance with operation 406 of FIG. 4. Initially, in operation 502, a chain of pointers to values is built for each rule.

Each value includes a pointer to an associated attribute type which, in turn, includes a pointer to a plurality of associated values. Such associated values each, in turn, include a pointer to the associated rule. More information regarding such a data structure will be set forth during reference to FIG. 6.

Any of the foregoing values that are common are then shared in operation 504. Still yet, a cost associated with each value is determined. Note operation 506. It should be noted that such cost may refer to a cost (i.e. in terms of resources, dollars, etc.) to process such value in the context of a test. As will soon become apparent, this cost is tracked for the purpose of minimizing overall cost of processing required by the resultant code.

Still yet, the attribute types are sorted in operation 508. In particular, the matrix attributes may be sorted with the highest precedence attributes first. The higher precedence attributes may be defined as those that have to be processed first. For example, a MAC portion of the packet may need to be processed before the IP portion, and the IP portion may need to be processed before the TCP or UDP portion.

Figure 6:
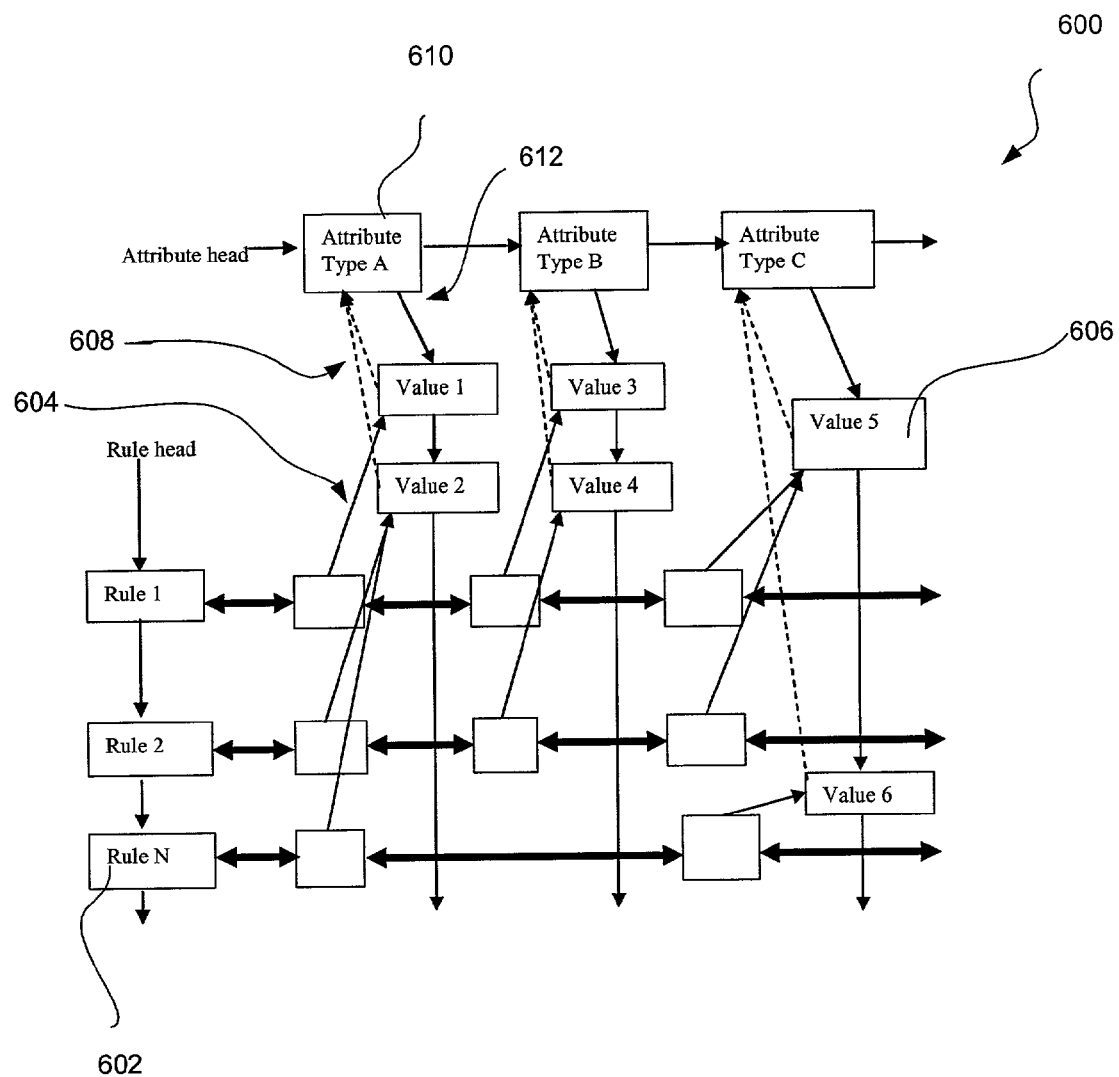
FIG. 6 illustrates an exemplary matrix that may be converted into a decision tree for generating the code, in accordance with one embodiment.

FIG. 6 illustrates an exemplary matrix 600 that may be converted into a decision tree for generating the code, in accordance with one embodiment. For each rule 602, a doubly-linked chain of first pointers 604 to values 606 is provided. Each value 606 has a second pointer 608 to an associated attribute type 610. Each attribute type 610 has a third pointer 612 to a list of associated children (i.e. values 606). Further, each value 606 has a list of fourth pointers back to the rules 602 that reference it (not shown). When several rules 602 specify the same value 606 for an attribute type 610, they may point to the same value 606. The chain of rule pointers allows rules 602 to contain a number of attribute types 610 and for common values 606 of attribute types 610 to be shared.

As mentioned earlier, associated with each value 606 is a metric of the cost of doing an associated test. When generating the code, a parser calculates the code sequence that minimizes the cost to process each packet.

Since the number of attribute types 610 may be variable, they may be sorted so that the decision tree is built appropriately (see sorting operation 508 of FIG. 5). Table 4 illustrates an exemplary sort order.

TABLE 4

The order of the nodes in a decision tree may determined by the option's sort order. For the mandatory fields there are predefined values. For options, one can change the sort order for that particular one using the syntax:
Optionname [@sortorder]: value;
An exemplary rule is as follows:
Content: "foo"; Content@2100:"bar";
Assuming the content option has a default sort order of 2000, this creates a decision tree where the 'then' part of the match for foo will do a match for 'bar'.
Default Sort Order values for current options.

| | |
|---|---|
| MAC_INIT | 100 |
| MAC_TYPE | 200 |
| IP_INIT | 300 |
| IP_PROTOCOL | 400 |
| IP_CHECKSUM | 500 |
| IP_DEFRAG | 600 |
| PROTO_INIT | 700 |
| TCP_INIT, UDP_INIT | 800 |
| TCP_DSTPORT | 900 |
| IP_DSTIP | 1000 |
| TCP_SRCPORT | 1100 |
| IP_SRCIP | 1200 |
| TCP_FLAGS | 1500 |
| TCP_STREAM1 | 1900 |
| TCP_STREAM2 | 1900 |
| CONTENT | 2000 |

After the sorting operation 508 of FIG. 5, the matrix is converted into a decision tree (see operation 408 of FIG. 4). This may be described as taking the matrix 600 and rotating it 90 degrees to the right so that the rules 602 become the columns and the attribute types 610 the rows. Each value 606 may be viewed as a bead on a 'rule' string. As part of the process, 'DEFAULT' values 606 are added to each row. Thus, all rules 602 have a value 606 for each attribute type 610 that has at least one non-default value 606.

Figure 7:
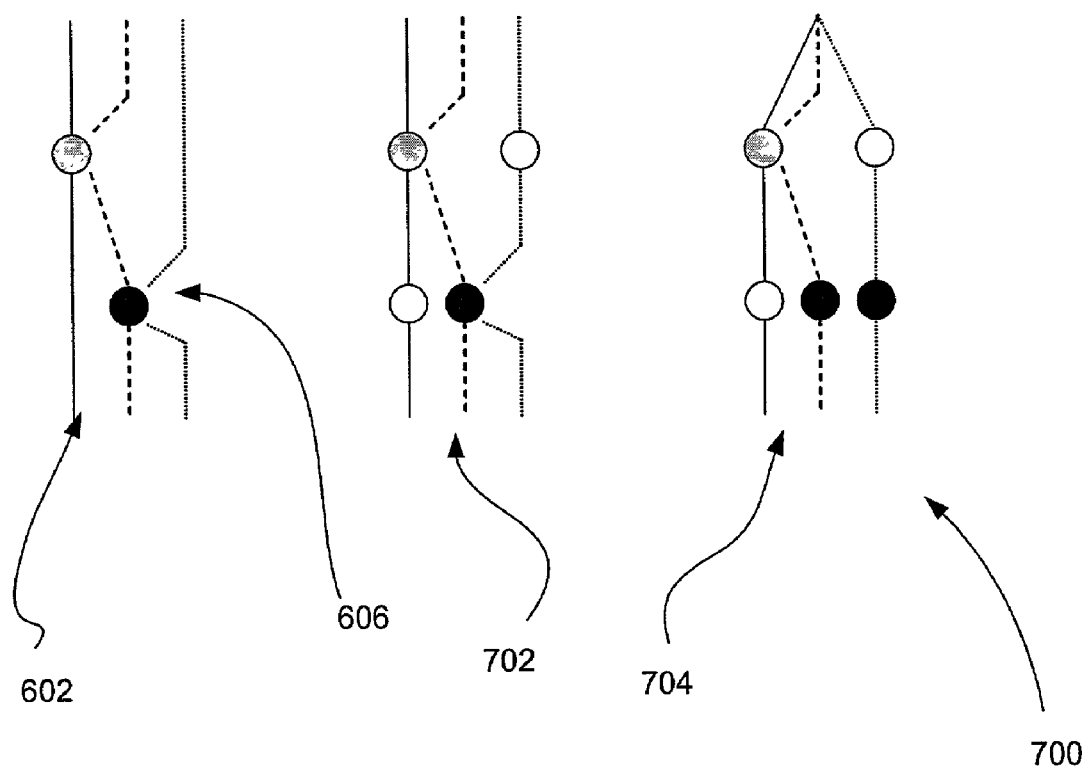
FIG. 7 illustrates the manner in which various rules may share values, in accordance with one embodiment.

The tree construction starts by tying all the top ends of the rule strings together to form the root of the tree. The values 606 of the first attribute type 610 form the first nodes in the first level of the tree. For each value in this row, the values 606 of the row below are examined. If the rules 602 in the lower value 606 do not pass through the current value 606, then the lower value 606 is duplicated and the rules 602 moved over to reference it instead. FIG. 7 illustrates the manner 700 in which various rules 602 may share values 606, in accordance with one embodiment. Such figure thus shows an example of the foregoing operations. The rules 602 are shown after the 90 degree rotation. One example 702 shows the addition of the default nodes. Another example 704 shows the aforementioned formation of the root.

The code generated from the decision tree may take various forms. For example, the code stream that is loaded into the engine may have a simple block structure. The first four bytes of the stream may be the characters "#SNI" which is followed by a number of blocks. Each block may have a four-byte header. The first byte may be an operation code. The next two bytes may be the length in big-endian order, and the fourth byte may be an attribute byte that can be used by the op-code. After the four-byte header, there may be the number of bytes specified by the length field. Thereafter, the next block or the end of the file may reside. See Table 5.

TABLE 5

| Op | Len | Arg | Data | Op | Len | Arg | Data |
|---|---|---|---|---|---|---|---|
| 0 | 1 | 2 | 3 4 | n | n+1 | n+2 | n+3 n+4 |

Current byte stream header operation codes.

| Op-Code | Content type | Arg byte usage. |
|---|---|---|
| 0 | Block of byte codes | Not used |
| 1 | Table of 8 bit signed integers | table number |
| 2 | end marker | Not used |
| 3 | Module Definition | Index into table 0 to store handle |
| 4 | Module Function Definition | Table number, first databyte is index in that table to store function handle |
| 5 | ByteAarry | Table number, first databyte is index in that table to store pointer to bytes. |

Alternate Embodiments

IP Fragment Assembly

An optional IP fragment assembly instruction may be provided to accommodate some cases where IP fragment assembly may not be necessary. The first fragmented IP packet may have enough data for the engine to make a decision. In a rule, it may be established that if the length of first fragmented IP packet is greater than a number, then the engine is to proceed without assembly. Otherwise, assembly is to be carried out on the packets long enough before passing down along the decision tree.

TCP Streaming

There may also be an instruction for TCP streaming. This instruction may be useful when there is an interest in an individual packet. This instruction may have an operand to specify the length of stream needed to perform assembly, or another operand to specify how long the system should wait for all necessary streams to arrive.

This may be implemented as follows. Once a packet reaches the decision of performing TCP streaming in a tree, the engine may create a new TCP stream or append it to the same existing stream. Then, other decisions can be made based on the operations performed on the stream. The operations may include content pattern matching, etc.

Application Level Decoding

Application level sessions based on the same TCP connection, like HTTP 1.1 (connection: keep-alive) may be supported. As an option, HTTP 1.0, whose session spans among different TCP connections, may be supported. One basic instruction may be used as a primitive to accomplish the desired tasks involving application protocols. Token level analysis of the stream may be included; comparing to a grammar level (like to check if stream has a particular SQL statement).

This instruction may perform a token pattern matching. Further, one of the operands may be a lex type expression. In use, such instruction may grab the pointer to the stream, and pass it to a lex analyzer along with the pattern expression to be matched. Another operand may be provided to indicate if one wants the pointer to stream to be advanced or intact. One reason to want the pointer to be intact is illustrated in the following example. If there is not a definite order of HOST and CONNECTION in an HTTP header, one can have the same starting pointer to do the matching for HOST and CONNECTION. One may need an operand to indicate the range of stream desired to do the matching (if one knows that token should fall in that range). Another operand may be needed to specify the number of tokens expected to pass before the desired one is found. Yet another operand may be a flag to indicate if one wants to extract the token after it is matched.

In yet another embodiment, the present system may operate at an application level instead of a TCP stream level. This may offer two advantages: (1) its makes rule expression easier to understand since it speaks the language of the application which the end user is more familiar with respect to TCP streaming; and (2) it adds an abstract layer so it makes coding easier.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for generating code for analyzing a network, comprising:
   identifying a plurality of rules defining a manner in which a network is to be analyzed; and
   generating code based on the rules;
   wherein the code is capable of being used by a network analyzer for analyzing the network in accordance with the rules;
   wherein the code is further generated by parsing the rules;
   wherein the rules are parsed to generate a matrix;
   wherein the matrix is generated by building a chain of pointers to values for each rule;
   wherein each value includes a pointer to an associated attribute type which in turn includes a pointer to a plurality of associated values which each in turn includes a pointer to the associated rule.

2. The method as recited in claim 1, wherein the rules are written in extensible markup language (XML).

3. The method as recited in claim 1, wherein the rules define abnormal network traffic to be detected on the network.

4. The method as recited in claim 1, and further comprising determining whether the rules have changed.

5. The method as recited in claim 4, wherein if it is determined that the rules have changed, re-generating the code.

6. The method as recited in claim 1, wherein the values that are common are shared.

7. The method as recited in claim 6, wherein the attribute types are sorted.

8. The method as recited in claim 1, wherein the matrix is converted into a decision tree.

9. The method as recited in claim 8, wherein the code is generated based on the decision tree.

10. The method as recited in claim 1, wherein a cost is identified.

11. The method as recited in claim 10, wherein the code is generated based on the cost.

12. A computer program product for generating code for analyzing a network, comprising:
    computer code for identifying a plurality of rules defining a manner in which a network is to be analyzed; and
    computer code for generating code based on the rules;
    wherein the code is capable of being used by a network analyzer for analyzing the network in accordance with the rules;
    wherein the code is further generated by parsing the rules;
    wherein the rules are parsed to generate a matrix;
    wherein the matrix is generated by building a chain of pointers to values for each rule;
    wherein each value includes a pointer to an associated attribute type which in turn includes a pointer to a plurality of associated values which each in turn includes a pointer to the associated rule.

13. A system for generating code for analyzing a network, comprising:
    a parser for identifying a plurality of rules defining a manner in which a network is to be analyzed, and generating code based on the rules; and
    a network analyzer engine coupled to the parser for analyzing the network in accordance with the rules using the code;
    wherein the code is further generated by parsing the rules;
    wherein the rules are parsed to generate a matrix;
    wherein the matrix is generated by building a chain of pointers to values for each rule;
    wherein each value includes a pointer to an associated attribute type which in turn includes a pointer to a plurality of associated values which each in turn includes a pointer to the associated rule.

14. A network analyzer, comprising:
    a parser for identifying a plurality of rules defining a manner in which a network is to be analyzed, and generating code based on the rules;
    wherein the code is capable of being used for analyzing the network in accordance with the rules;
    wherein the code is further generated by parsing the rules;
    wherein the rules are parsed to generate a matrix;
    wherein the matrix is generated by building a chain of pointers to values for each rule;
    wherein each value includes a pointer to an associated attribute type which in turn includes a pointer to a plurality of associated values which each in turn includes a pointer to the associated rule.

15. A method for generating code for analyzing a network, comprising:
    identifying a plurality of rules defining a manner in which a network is to be analyzed, wherein the rules are written in extensible markup language (XML) and define abnormal network traffic to be detected on the network;
    determining whether the rules have changed;
    if it is determined that the rules have changed, parsing the rules to define a matrix by:
    building a chain of pointers to values for each rule, wherein each value includes a pointer to an associated attribute type which in turn includes a pointer to a plurality of associated values which each in turn includes a pointer to the associated rule,
sharing values that are common,
identifying a cost associated with each value, and
sorting the attribute types;
converting the matrix into a decision tree; and
generating code based on the decision tree and the cost;
wherein the code is capable of being used by a network analyzer for analyzing a network in accordance with the rules.

16. A system for generating code for securing a network, comprising:
a parser for identifying a plurality of rules defining a manner in which a network is to be secured, and generating code based on the rules; and
a security program coupled to the parser for securing the network in accordance with the rules using the code;
wherein the code is further generated by parsing the rules;
wherein the rules are parsed to generate a matrix;
wherein the matrix is generated by building a chain of pointers to values for each rule;
wherein each value includes a pointer to an associated attribute type which in turn includes a pointer to a plurality of associated values which each in turn includes a pointer to the associated rule.

17. The system as recited in claim 16, wherein the rules involve heuristics.

* * * * *